US011236589B2

(12) United States Patent
Rasmussen

(10) Patent No.: US 11,236,589 B2
(45) Date of Patent: Feb. 1, 2022

(54) SUBSEA SYSTEM AND METHOD OF INSTALLING A SUBSEA SYSTEM

(71) Applicant: FMC Kongsberg Subsea AS, Kongsberg (NO)

(72) Inventor: Stein Rune Rasmussen, Kongsberg (NO)

(73) Assignee: FMG Kongsberg Subsea AS, Kongsberg (NO)

( * ) Notice: Subject to any disclaimer, the term of this patent is extended or adjusted under 35 U.S.C. 154(b) by 0 days.

(21) Appl. No.: 16/757,351

(22) PCT Filed: Sep. 21, 2018

(86) PCT No.: PCT/EP2018/075619
§ 371 (c)(1),
(2) Date: Apr. 17, 2020

(87) PCT Pub. No.: WO2019/076580
PCT Pub. Date: Apr. 25, 2019

(65) Prior Publication Data
US 2021/0189841 A1 Jun. 24, 2021

(30) Foreign Application Priority Data
Oct. 17, 2017 (NO) .................................. 20171647

(51) Int. Cl.
E21B 43/013 (2006.01)
E21B 33/038 (2006.01)
E21B 43/017 (2006.01)

(52) U.S. Cl.
CPC .......... E21B 43/013 (2013.01); E21B 33/038 (2013.01); E21B 43/017 (2013.01)

(58) Field of Classification Search
CPC ..... E21B 43/013; E21B 33/038; E21B 43/017
See application file for complete search history.

(56) References Cited

U.S. PATENT DOCUMENTS 3,220,477 A * 11/1965 Jones ...................... E21B 41/10
166/351
3,633,667 A * 1/1972 Falkner, Jr. ........... E21B 33/035
166/366
4,120,362 A 10/1978 Chateau et al.

FOREIGN PATENT DOCUMENTS

GB 2 179 081 A 2/1987
NO 315721 B1 11/2002
(Continued)

Primary Examiner — James G Sayre

(57) ABSTRACT

Subsea system (100) and method of installing the subsea system (100), the method comprising the steps of: —preparing a first foundation (1') comprising at least a first dedicated position for receiving a first subsea station (3', 13'), —providing the first foundation (1') with at least a first guide system (4'), —installing the first foundation (1') at a subsea location, —preparing at least a first subsea station (3', 13') comprising a first flow module (5') for connection with a pipeline (6), —installing the at least first subsea station (3', 13') with the first flow module (5') in the first dedicated position on the first foundation (1'), —preparing a pipeline (6) and providing the pipeline (6) with at least a first T-connection (7') at a determined calculated position corresponding to the first dedicated position on the first foundation (1'), —installing the pipeline (6) and allowing the pipeline (6) to rest on the first guide system (4') on the first foundation (1') such that the first T-connection (7') is arranged at or in the proximity of the first dedicated position on the first foundation (1'), —preparing a first piece of pipe (8') and connecting the first T-connection (7') of the pipeline (6) with the first flow module (5') on the first subsea station (3', 13') using the first piece of pipe (8').

13 Claims, 5 Drawing Sheets

(56) References Cited

FOREIGN PATENT DOCUMENTS

| WO | WO-2004085789 A2 | * | 10/2004 | ............ | E21B 41/08 |
| WO | WO 2004085789 A2 | | 10/2004 | | |
| WO | WO 2017/174968 A1 | | 10/2017 | | |
| WO | WO 2018/111120 A1 | | 6/2018 | | |
| WO | WO 2018/115347 A1 | | 6/2018 | | |
| WO | WO-2018115347 A1 | * | 6/2018 | ............ | E21B 41/04 |

* cited by examiner

SUBSEA SYSTEM AND METHOD OF INSTALLING A SUBSEA SYSTEM

The invention relates to a method and system for a subsea installation.

BACKGROUND OF THE INVENTION

The development of subsea production systems started with dedicated production manifolds for each satellite well. The production manifold was arranged at a platform for processing and further transport. Once the hydrocarbon discoveries entered deeper water depths, a common manifold system for a plurality of subsea wells became the standard solution for subsea processing of hydrocarbons from said wells, either as part of a template/manifold system or a manifold/satellite system.

Furthermore, normally the connections between flow modules on respective Xmas Trees are connected via a pipeline to a common manifold, and each pipeline must be connected to the flow module on one end thereof and to the manifold on the other end thereof.

The prior art includes NO 315721B1 and U.S. Pat. No. 4,120,362.

NO 315721B1 discloses a subsea production system comprising a pipeline with a T-connection for collecting hydrocarbons at the seafloor. The pipeline is pre-installed subsea. Then a pipe spool together with a guide base for a riser is installed subsea. The well is drilled and the Xmas Tree is installed. The pipe piece is then connected to the T-connection on the pipeline and production through the pipeline can start.

U.S. Pat. No. 4,120,362 discloses a subsea station or installation in which one or more rigid elongated base templates are adapted to be permanently positioned on a sea floor. Along each side of the base means and mounted about a vertical pivotal axis are a plurality of spaced flowline support arms of generally V-shape for supporting a flowline alongside the base means. During installation, each support arm may be pivoted about its pivotal axis to lie generally within the plane of the top and bottom side tubular members. The arms may be rotated through 45 degrees to extend outboardly from the base means after the base means has been positioned on the seabed.

Thus, an objective of the present invention is to overcome at least some of the drawbacks associated with the prior art solutions.

More specifically, an objective of the present invention is to render the use of a manifold for collecting production pipelines from the Xmas Trees or processing systems or production systems superfluous.

Another objective of the invention is to ease the installation of pipelines subsea.

Another objective of the invention is to provide a system and method for easy swapping of a Xmas Tree from production to injection.

Another objective is to reduce, or even eliminate, the need for seabed preparations for the pipelines.

SUMMARY OF THE INVENTION

The invention is set forth and characterized in the independent claims, while the dependent claims describe other characteristics of the invention.

A difference between the prior art solutions and the new solution, is, e.g. that in the prior art solutions, the flow modules on the respective subsea stations are connected via a pipeline to a common manifold, and each pipeline must be connected to the flow module on one end thereof and to the manifold on the other end thereof.

The present invention provides an advantage in relation to known solutions. For example, the subsea stations with flow modules and T-connections on the pipelines renders the use of a manifold for collecting the production pipelines from the subsea stations superfluous on a common foundation. Thus, the modified subsea stations with flow modules, together with the T-connections on the pipelines, have all the features and properties the manifold normally has, thus rendering the manifold superfluous.

Other advantages of the system and method in accordance with the present invention may be one or more of the following:

Provides for the possibility of several seabed configurations with Integrated SURF (Subsea Umbilical, Riser and Flowline systems)/SPS (Subsea Production and Processing Systems) solutions, thus providing low cost subsea systems and architectures.

Renders possible progressive field developments and flexibility in the subsea development architecture.

Allows for connection of more than just Xmas Trees through e.g. pumps, making it more versatile.

Simplifies subsea Tie-In.

Enables the foundation, e.g. in the event of a template or satellite wells, to be configured to have 1 to 4 slots, possibly 6 slots, in one lift. Alternatively, enables the foundation to be configured to have more slots, typically 8 to 12 slots, for attached foundation(s) in several lifts.

Provides the option of having a modular foundation (by attachable modules).

Enables the system to be configured for early low cost investment for start-up and architectures and then populated as needed in LOF (Life of Field).

Enables flowline sizes to be independent of the rest of the SPS (Subsea Production System) equipment.

Enables all sealines to be continuous lay installed, thereby saving vessel time.

Provides installation flexibility for pipelay/drilling operations/Xmas tree installation/completions.

Allows for standardization of connectors and valves between In Line Tees (ILT) and Modular In Line connections (MILCs) (for example 6 inches (0.1524 meters) or 7 inches (0.1778 meters)) independent of main flowline sizes.

Enables the use of standard umbilical UTA's (Umbilical Termination Assembly).

Requires less (or no) use of additional sealine protection for the T-parts of the pipeline, as these are covered by the protective cover for the foundation.

Allows for installation and commissioning of Xmas Trees by Tree Installation Well Opening (TIWO).

Makes re-use of subsea equipment easier during Life of Field (LOF).

Enables satellites to be easily tied into a free In Line Tee (ILT) if needed.

The principle of the invention is to provide a pipeline with pre-installed In-line Tee's (ILT's) in one or more sections of the pipeline length, and install and lay this pipeline directly onto a pre-defined area on a subsea structure intended as a foundation for one or more subsea stations, including Xmas trees and subsea equipment such as flow modules, connection modules, umbilical termination head(s), subsea processing modules, pumps, compressors etc. In an aspect, the ILT's will then form the basis of connection points towards the subsea stations on the same subsea structure by modular in-line connection (MILC) modules. The subsea foundation/structure will form the foundation of the pipeline end at the same time.

The invention utilizes multiple ILT's as part of a pipeline to be placed directly as a continuous laid pipeline onto a subsea structure for subsea stations, and facilitates connection points directly toward the subsea station's module without an intermediate manifold in place.

The method of installing the pipeline and ILT's onto the subsea structures and allowing the pipeline to be connected to the subsea stations on the same subsea foundation structure, thus forming a subsea production system without the manifold, is also part of the inventive concept.

The invention relates to a method of installing a subsea system, the method comprising the steps of:
- preparing a first foundation comprising at least a first dedicated position for receiving a first subsea station,
- providing the first foundation with at least a first guide system,
- installing the first foundation at a subsea location,
- preparing at least a first subsea station comprising a first flow module for connection with a pipeline,
- installing the at least first subsea station with the first flow module at the first dedicated position on the first foundation,
- preparing a pipeline and providing the pipeline with at least a first T-connection at a determined calculated position corresponding to the first dedicated position on the first foundation,
- installing the pipeline and allowing the pipeline to rest on the first guide system on the first foundation such that the first T-connection is arranged at or in the proximity of the first dedicated position on the first foundation, and
- preparing a first piece of pipe and connecting the first T-connection of the pipeline with the first flow module on the first subsea station using the first piece of pipe.

The steps in the method do not necessarily have to be performed in the specific order above provided the foundation is installed first. For instance, the step of installing the at least first subsea station may be performed after the step of installing the pipeline.

The feature of installing the pipeline and allowing the pipeline to rest on the first guide system on the foundation such that the first T-connection is arranged at or in the proximity of the first dedicated position on the foundation shall be understood in a way that the positions of the T-connections along the pipeline are chosen based on the expected, i.e. known, positions of the subsea stations. In these positions, the pipeline and T-connections are aligned with the subsea stations and the pieces of pipe from the T-connections to the dedicated Xmas Trees can be prepared.

The pipeline may be terminated in normal ways, or a T-connection may form the pipeline end termination, wherein two of the outlets of the "T" are connected to separate Xmas Trees.

The foundation can have a dedicated position for a single subsea station, or can be a template with one, two, three, four, five, six, seven, eight etc. dedicated positions for subsea stations. The foundation can be used as a support for subsea stations such as Xmas trees, subsea processing modules (boosting, separation, etc).

The guide system(s) may form an integral part of the foundation or may be connected to the foundation. The guide system(s) are arranged or positioned in optimum positions relative the dedicated positions on the foundation, thus rendering use of short pieces of pipe between the pipeline and the respective flow control modules, and easier connections, possible. The guide system may be in the form of slots, grooves, or other coarse guiding means.

An advantage of using the guide system(s) is the avoidance or minimizing of the need for preparation of the seabed before laying of a pipeline, as the pipeline(s) rest or lay on the guide system instead. As the seabed can be irregular with e.g. bumps, trenches, etc., seabed preparations may include significant time and cost expenditure. The method and system provide for less need for seabed preparations due to flowlines/umbilical resting on the guide system(s) on the foundation(s).

In an aspect, the method may further comprise the steps of:
- providing the pipeline with a second T-connection at a determined calculated position corresponding with a second dedicated position on the first foundation for receiving a second subsea station,
- installing the pipeline and allowing the pipeline to rest on the at least first guide system on the first foundation such that when the pipeline is resting on the first foundation, the second T-connection is arranged at or in the proximity of the second dedicated position on the first foundation, and
- preparing a second piece of pipe and connecting the second T-connection of the pipeline with the flow module on the second subsea station using the second piece of pipe.

In an aspect, the method may further comprise the steps of, before lowering the first foundation subsea,
- providing an additional guide system on the first foundation for receiving an additional pipeline, such as a production pipeline, gas injection/gas lift line, sealine, umbilical, or combinations thereof.

In an aspect, the method may further comprise:
- preparing a second foundation comprising at least a second dedicated position for receiving a second subsea station,
- providing the second foundation with at least a second guide system,
- installing the second foundation with a second guide system in accordance with the method described above,
- installing the pipeline by allowing the pipeline to rest on the at least first guide system on the first foundation and the second guide system on the second foundation, such that when the pipeline is resting on the first foundation and the second foundation, the T-connections are arranged at or in the proximity of dedicated positions on the first foundation and the second foundation, and
- preparing pieces of pipe and connecting the T-connections of the pipeline with flow modules on any subsea station(s) using the pieces of pipe.

In an aspect, the method may, when the subsea station(s) is a Xmas tree(s), further comprise, after installing a subsea system in accordance with any of the preceding claims, the step of:
- swapping the flow direction of a Modular In Line Tee Connector (MILC) such as to change one or more of the at least first or any additional Xmas Trees from operating as a production Xmas Tree to an injection Xmas Tree, or vice versa.

Thus, the possibility of easily changing the Xmas Tree from operating as a production Xmas Tree to an injection Xmas Tree by swapping the MILC direction provides flexibility in the subsea installation and is an advantage of the invention. I.e., a Xmas Tree initially producing may easily be swapped to an injection tree by using a MILC to connect/swap Gas Lift/Gas Injection lines to the flow module on the respective Xmas Tree.

In an aspect, the method can further comprise, after installing any of the first, second or additional foundation(s), but before installing a subsea station, the step of:

drilling a well through a Xmas tree slot in the foundation(s). The drilling of the well can thus be performed either before or after the pipeline(s) has been laid. In the event of drilling, the foundation is provided with at least one slot through which the drilling is conducted.

The first foundation, and any other additional second, third, fourth foundation etc., could be of a mudmat or suction anchor design. The design is dependent on the soil and method of installation as well as specific well requirements (e.g. Wellhead Load Release (WLR) requirements). Furthermore, the foundations may be of modular design, rendering it possible to make larger or smaller foundations based on the demands in the specific projects as well as installation of larger or smaller pieces of the foundation in one or multiple trips, possibly by using lighter and smaller installation vessels than prior art solutions.

The invention further relates to a subsea system comprising:

a first foundation comprising at least a first dedicated position for receiving a first subsea station, at least a first subsea station comprising a first flow module for connection with a pipeline, wherein the first foundation comprises at least a first guide system for guiding the pipeline to rest on the first foundation, and a pipeline for connection with the first flow module, wherein the pipeline is provided with at least a first T-connection, and wherein, when the pipeline is resting on the first foundation, the first T-connection is arranged at or in the proximity of the first dedicated position on the first foundation. Thus, according to the present invention, the pipeline has T-connections at dedicated positions relative the respective flow modules on subsea stations arranged subsea.

In an aspect of the subsea system, the pipeline may be provided with a second T-connection, and when the pipeline is resting on the first foundation, the second T-connection is arranged at or in the proximity of a second dedicated position on the first foundation.

In an aspect of the subsea system, the first foundation may comprise an additional guide system for receiving an additional pipeline, such as a production pipeline, gas injection/gas lift line, sealine, umbilical, or combinations thereof. The additional guide system may form part of the guide system for the pipeline or may be a separate guide system.

In an aspect, the subsea station can be a processing system or processing equipment, a production system, a X-mas tree, or a combination thereof. The subsea processing system or processing equipment herein also includes a subsea production system, and includes, but is not limited to: separators, pumps, boosters, injection systems, compressors etc.

In an aspect of the subsea system, the system may further comprise a second foundation with guide system(s) or any number of additional foundations with guide system(s).

In an aspect of the subsea system the first foundation, a second foundation, or any additional foundation may be a well template, a satellite well, a foundation for a processing system or processing equipment, or a production system.

In an aspect, the system may comprise a pipeline formed with T-connections. The end of the T-connection may comprise a connection in the form of a shoulder, flange or other means adapted to connect with a corresponding connection piece on one end of the piece of pipe. The other end of the piece of pipe is connected to a flow module of a subsea station. The end of the T-connection may comprise a flow control device, e.g. a valve or similar device, which may be operated to open or close the flow of fluid from the pipeline to the flow module. In addition, or alternatively, the piece of pipe may comprise a flow control device. The flow control device(s) may be remotely operated from topside or AUV (Autonomous Underwater Vehicle) or operated via ROV (Remotely Operated Vehicle).

In an aspect, the subsea system may comprise overtrawlable covers for each dedicated position, or the whole foundation(s), if needed. Such overtrawlable covers, or covers for dropped object impact protection, may be of plastic design, Glass Reinforced Plastic (GRP) design, composite design, or other suitable design.

Although the invention is described mainly in relation to the method, it is clear that the features described in relation to the method are relevant for the system according to the invention as well.

These and other characteristics of the invention will be clear from the following description of a preferential form of embodiment, given as a non-restrictive example, with reference to the attached drawings wherein;

DETAILED DESCRIPTION OF A PREFERRED EMBODIMENT

In the following description of the Figures, the features described in relation to the system are valid for the method according to the invention as well, and vice versa (i.e. method features may be relevant for the system).

Figure 1:
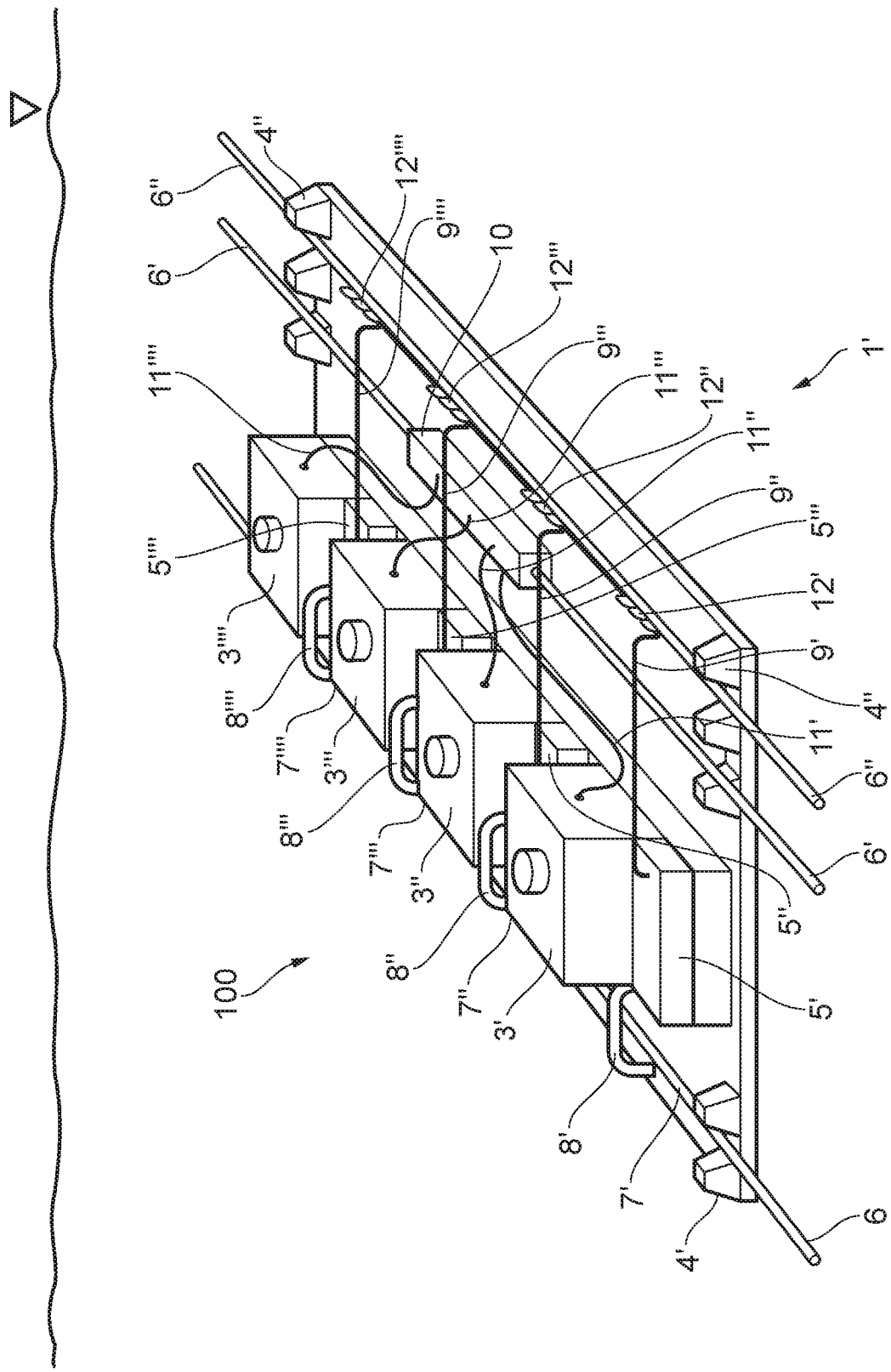
FIG. 1 shows an example of a subsea system comprising a foundation in the form of a well template with four Xmas Tree slots and four Xmas Trees.

FIG. 1 shows an example of a subsea system 100 comprising a first foundation 1' in the form of a well template with four Xmas Tree slots and four Xmas Trees. The first foundation 1' comprises a first Xmas Tree slot 2' at a first dedicated position on the first foundation 1' for receiving a first Xmas Tree 3'. In addition, the first foundation 1' comprises a second Xmas Tree slot 2'', a third Xmas Tree slot 2''', and a fourth Xmas Tree slot 2'''', each with a Xmas Tree 3", 3'", 3"" mounted thereon. (The first, second, third and fourth Xmas Tree slots 2', 2", 2'", 2"" are not visible in FIG. 1, but see FIG. 3 for examples). Each Xmas Trees 3', 3", 3'", 3"" has its own flow module 5 (first, second, third and fourth flow modules 5', 5", 5'", 5"") for connection with a pipeline 6. The pipeline 6 is typically a production line or may also be an injection line, and may direct fluids to or from a processing installation.

The first foundation 1' comprises at least a first guide system 4' for guiding the pipeline 6 to rest on the first foundation 1'. The pipeline 6 is connectable to at least one of the flow modules 5', 5", 5'", 5"" via a respective piece of pipe 8', 8", 8'", 8"". The pipeline 6 is provided with at least a first T-connection 7', 7", 7'", 7"" to which the piece of pipe 8', 8", 8'", 8"" is connected. When the pipeline 6 is resting on the first foundation 1', the at least first T-connection 7' is arranged at or in the proximity of the first dedicated position on the first foundation 1'. Similarly, in the disclosed example of FIG. 1, there is a second T-connection 7" arranged at or in the proximity of a second dedicated position (i.e. the second Xmas Tree 3" with second flow module 5"), a third T-connection 7'" arranged at or in the proximity of a third dedicated position (i.e. the third Xmas Tree 3'" with third flow module 5'"), and a fourth T-connection 7"" arranged at or in the proximity of a fourth dedicated position (i.e. the fourth Xmas Tree 3"" with fourth flow module 5"").

The Xmas Trees 3', 3", 3'", 3"" are shown connected to and an Umbilical Termination Assembly (UTA) 10 via flying leads 11', 11", 11'", 11"", which UTA 10 may be connected to one or more umbilicals (UMB) 6' leading to a surface or onshore location, or another location subsea. The umbilical 6' may have all the features of an umbilical, including the necessary controls, energy, electrics, fiber optic, fluid, hydraulics, etc.

The first foundation 1' is shown to comprise a first guide system 4' for the pipeline 6' and a second guide system 4" for the additional pipelines, e.g. the umbilical 6' and a Gas Lift/Gas Injection (GL/GI) line 6". The guide systems 4', 4" are shown as at least two individual guide elements, where each guide element is upwardly projecting and has a conical shape. As such, two neighboring guide elements form a coarse guiding part at the outermost portion leading to a fine guiding part closest to the surface of the foundation 1' between them. The guide elements may have other shapes as long as they provide for some guiding and support of any of the pipelines 6, 6', 6". One pipeline may be supported by one or more guide systems 4', 4", e.g. as disclosed in FIG. 1, where both the umbilical 6' and the GL/GI line 6" are guided on both longitudinal ends of the first foundation 1'.

One or more of the flow modules 5', 5", 5'", 5"" can be connected to an additional pipeline in the form of a GL/GI line 6" via dedicated Modular Inline Tee Connectors (MILCs) 9', 9", 9'", 9"" from the first, second, third, and fourth flow module 5', 5", 5'", 5"", respectively, and to dedicated connection points 12', 12", 12'", 12"" (e.g. T-connections) on the GL/GI line 6". Flow control devices, e.g. valves, may be arranged at these connection points 12', 12", 12'", 12"" or in the MILCs 9', 9", 9'", 9"" for allowing or preventing through-flow. The flow direction through the MILCs 9', 9", 9'", 9"" can be swapped such as to change one or more of the at least first or any additional Xmas Trees 3', 3", 3'", 3"" from operating as a production Xmas Tree 3', 3", 3'", 3"" to an injection Xmas Tree 3', 3", 3'", 3"", and vice versa.

The MILCs 9', 9", 9'", 9"", the pieces of pipe 8', 8", 8'", 8"", and the flying leads 11', 11", 11'", 11"", as well as any flow control devices, may be remotely operated from topside or AUV/ROV-operated.

Figure 2:
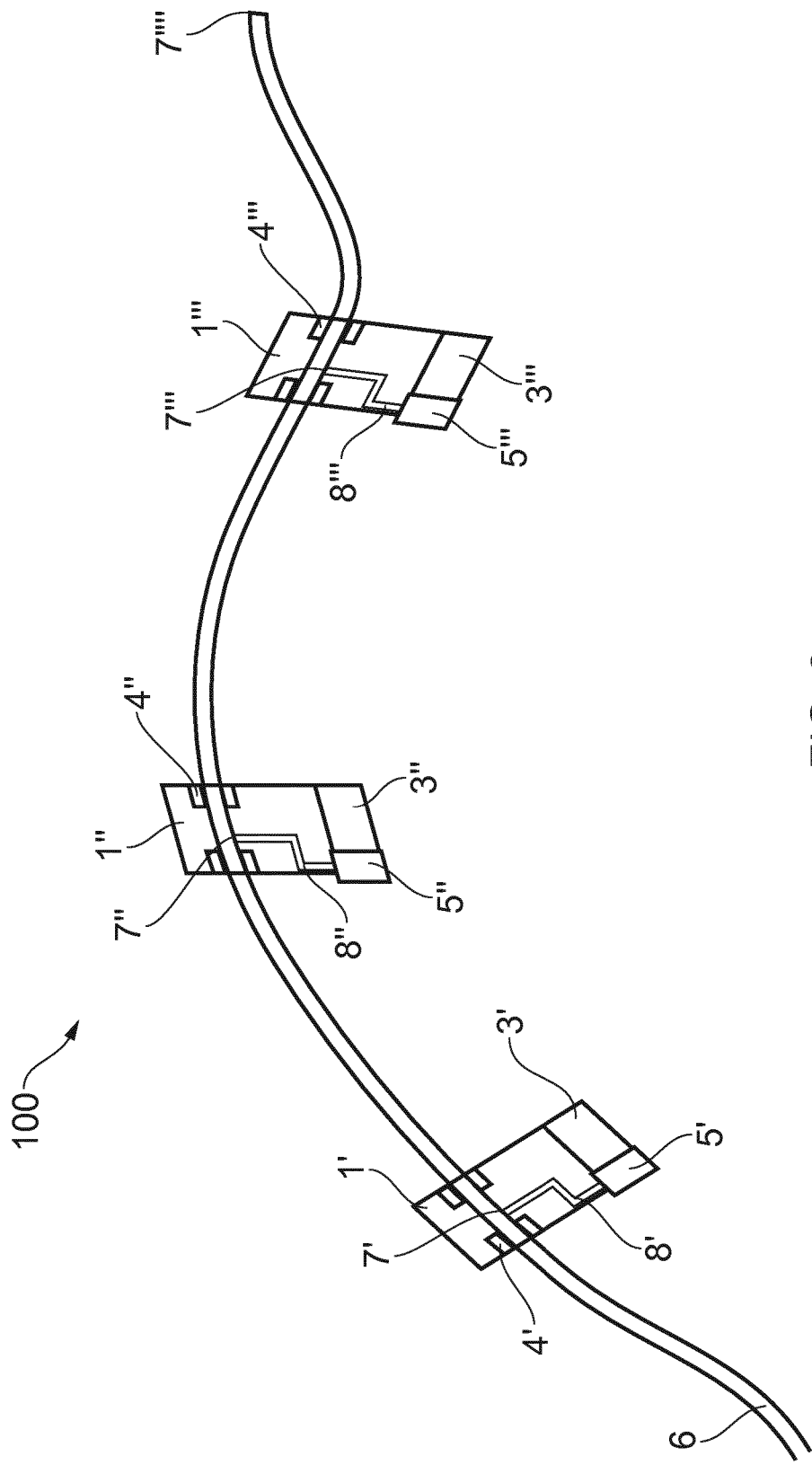
FIG. 2 shows an example of a subsea system comprising three foundations in the form of satellite wells, where a pipeline is laid over all of the satellite wells.

FIG. 2 shows an example of a subsea system 100 comprising three foundations in the form of satellite wells, where a pipeline is laid over all of the three satellite wells. It is obvious that there may be more or less than three satellite wells in the subsea system, such as two, four, five, six, seven, eighth, nine, ten, etc. satellite wells. Each of the first foundation 1', the second foundation 1" and the third foundation 1'" is disclosed with one satellite Xmas Tree 3', 3", 3'" and dedicated flow module 5', 5", 5'" connected to the pipeline 6 via pieces of pipe 8', 8", 8'", respectively. Each piece of pipe 8', 8", 8'" is connected to the pipeline at a separate T-connection 7', 7", 7'". The termination of the pipeline 6 is at a fourth T-connection 7"", where any flow control devices provided in the fourth T-connection 7"" have been closed, preventing through-flow in the pipeline.

In order to arrive at the particular setup in FIG. 2, the following steps are conducted:

preparing a first foundation 1', the first foundation comprising a first Xmas Tree slot 2' at a first dedicated position on the first foundation 1' for receiving a first Xmas Tree 3'. The Xmas Tree 3' has its own flow module 5' for connection with the pipeline 6. The first foundation 1' comprises at least a first guide system 4' for guiding the pipeline 6 to rest on the first foundation 1'. The pipeline 6 has a first T-connection 7' for connection with the flow module 5' via a first piece of pipe 8'.

preparing a second foundation 1" comprising at least a second Xmas Tree slot 2" at a second dedicated position on the second foundation 1" for receiving a second Xmas Tree 3", providing the second foundation 1" with at least a second guide system 4", and installing the second foundation 1" with the second guide system 4" in accordance with the steps above for the first foundation 1', and preparing a third foundation 1'" comprising at least a third Xmas Tree slot 2'" at a third dedicated position on the third foundation 1'" for receiving a third Xmas Tree 3'", providing the third foundation 1'" with at least a third guide system 4'", and installing the third foundation 1'" with the third guide system 4'" in accordance with the steps above for the first foundation 1', and installing the pipeline 6 by allowing the pipeline 6 to rest on the at least first guide system 4' on the first foundation 1', the second guide system 4" on the second foundation 1" and the third guide system 4'" on the third foundation 1'", such that when the pipeline 6 is resting on the first foundation 1', the second foundation 1" and the third foundation, the T-connections 7', 7", 7'" are arranged at or in the proximity of dedicated positions on the first foundation 1', the second foundation 1" and the third foundation 1'", and preparing pieces of pipe 8', 8", 8'" and connecting the T-connections 7', 7", 7'" of the pipeline 6 with flow modules 5', 5", 5'" on the first, second and third Xmas Trees 3', 3", 3'" using the pieces of pipe 8', 8", 8'".

However, as mentioned above, the steps in the method do not necessarily have to be performed in the specific order above provided the foundation is installed first. For instance, the step of installing the at least first Xmas Tree may be performed after the step of installing the pipeline.

Figure 3:
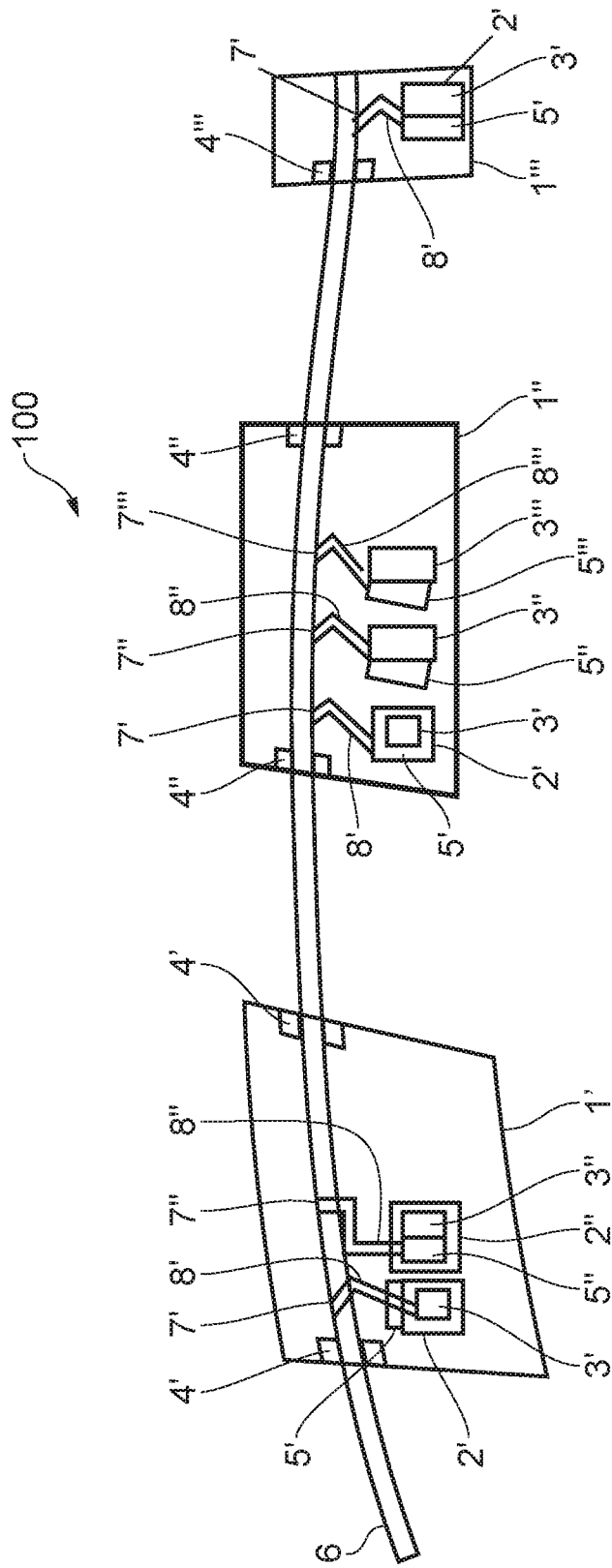
FIG. 3 shows an example of a subsea system comprising three foundations in the form of well templates with two and three Xmas Tree slots and Xmas Trees, as well as a satellite well.

FIG. 3 shows an example of a subsea system 100 comprising three foundations in the form of well templates with two and three Xmas Tree slots and Xmas Trees, as well as a satellite well. The method of installation is similar as for the examples in FIGS. 1 and 2. As can be seen in FIG. 3, the pipeline 6 is laid over three foundations 1', 1", 1''', where the first foundation 1' (on the left hand side in the figure) is exemplified as a well template comprising two Xmas Tree slots 2', 2" and two Xmas Trees 3', 3". The Xmas trees 3', 3" are connected to respective flow control modules 5', 5" which again are connected to T-connections 7', 7" on the pipeline 6 via pieces of pipe 8', 8". The second foundation 1" is exemplified as a well template comprising three Xmas Tree slots 2', 2", 2''' (only one of which is shown) and three Xmas Trees 3', 3", 3'''. Each of the Xmas Trees 3', 3", 3''' is connected to respective flow control modules 5', 5", 5''' which again are connected to T-connections 7', 7", 7''' on the pipeline 6 via pieces of pipe 8', 8", 8'''. The third foundation 1''' is exemplified as a satellite well with a Xmas Tree slot 2', a Xmas Tree 3' connected to a flow control module 5' and a piece of pipe 8' connecting the flow control module 5' to the pipeline 6 via a T-connection 7'. The pipeline 6 is terminated at the third foundation 1''', e.g. by a standard end termination or a T-connection, etc. The first foundation 1' is provided with a first guide system 4', the second foundation 1" is provided with a second guide system 4" and the third foundation 1''' is provided with a third guide system 4'''. As is clear from the illustration of the first and second foundations 1', 1", more than one guide system 4', 4" may be arranged on the same foundation 1', 1", i.e. two, three, four etc. guide systems. For example, guide systems 4', 4" may be arranged at two opposite ends of the foundation(s) 1', 1" dependent on the position of the Xmas Tree(s) on the foundation.

Figure 4:
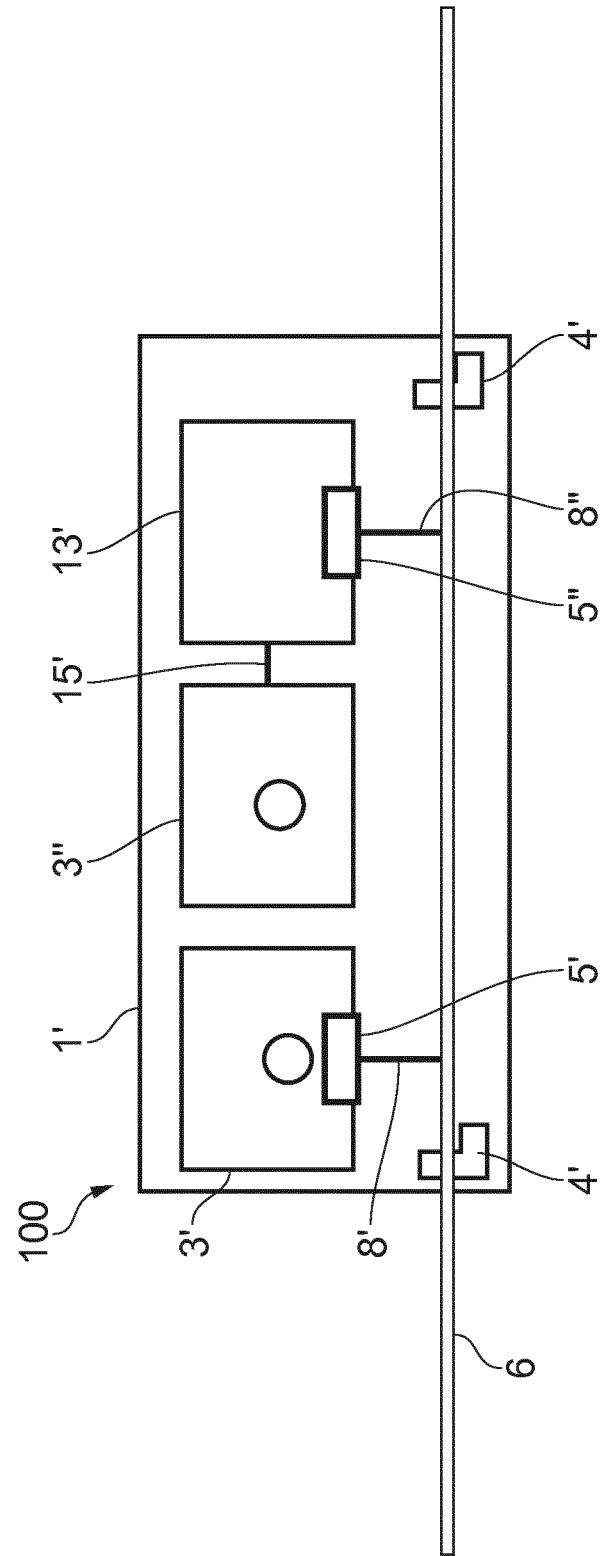
FIG. 4 shows an example of a subsea system comprising one foundation with three subsea stations exemplified as two Xmas trees and one processing system in the form of a boosting station, where one of the Xmas trees is connected directly to a pipeline while the other Xmas tree is connected to a pipeline via a processing system.

FIG. 4 shows an example of a subsea system 100 comprising one foundation 1' with three subsea stations 3', 3", 13' exemplified as a first and second Xmas tree 3', 3" and one processing system 13'. The first Xmas tree 3' is connected directly to the pipeline 6 via a first piece of pipe 8' and a first flow module 5' (as in FIG. 1). The fluid flowing from the well through the first Xmas tree 3' thus has sufficient flow/pressure to flow through the pipeline 6 without pressure assistance. However, the second Xmas tree 3" is connected to the pipeline 6 via a processing system 13' which is connected to the pipeline 6 via second flow module 5" and second piece of pipe 8". In the setup in FIG. 5 the processing system 13' can optionally be a booster to boost the pressure of the fluid flowing through the second Xmas tree 3", thereby assuring that the well fluids can flow the required distance through pipeline 6. The pipeline 6 rests on the first guide system 4'.

Figure 5:
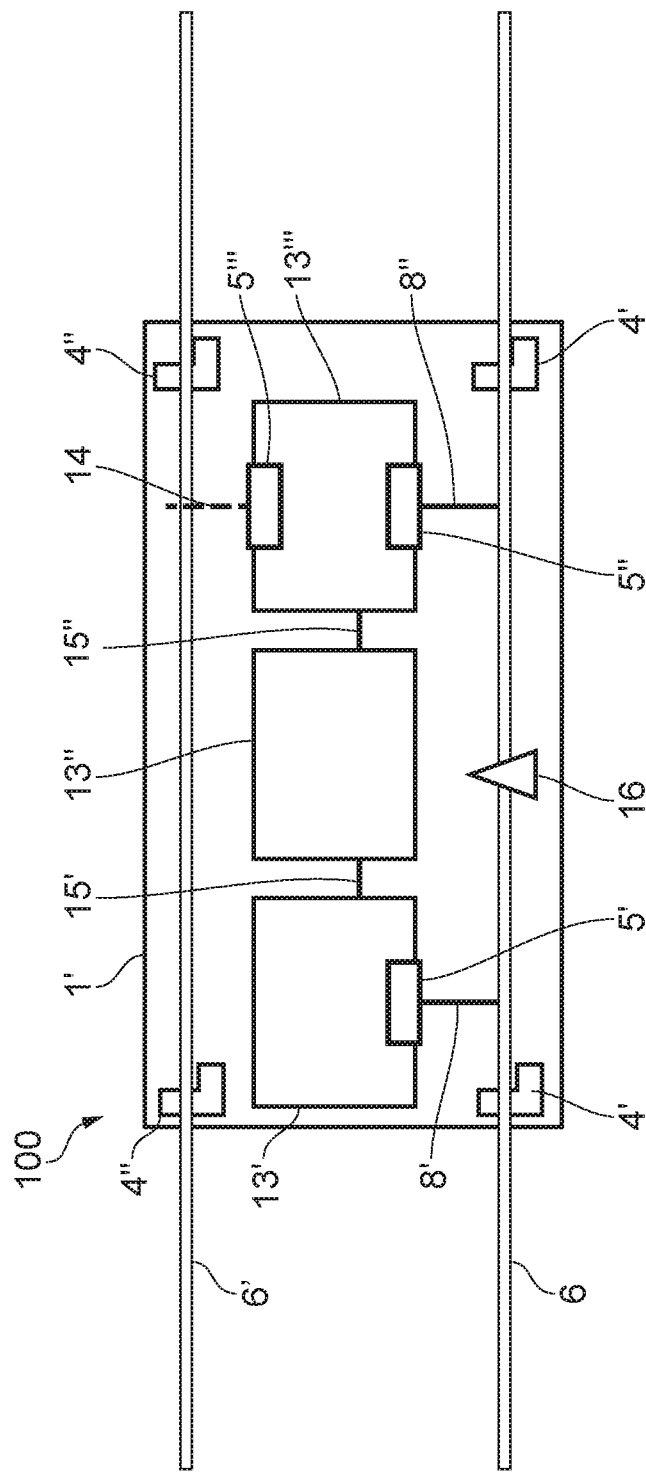
FIG. 5 shows an example of a subsea system comprising one foundation with three subsea stations exemplified as three processing systems directly connected to each other, where the three processing systems have a common inlet from a pipeline and two common outlets guiding the processed flow to two different pipelines.

FIG. 5 shows an example of a subsea system 100 comprising one foundation 1' with three subsea stations 13', 13", 13''' exemplified as three processing systems 13', 13", 13''' directly connected to each other via connection lines 15', 15". In this setup, the flow regulating device 16 (e.g. a valve) in the pipeline 6 is adapted to be manipulated to close the flow through the pipeline 6 such that the flow in the pipeline 6 is guided into the first piece of pipe 8', through a first flow module 5' and into a first processing system 13'. The three processing systems have a common inlet from pipeline 6 through the first piece of pipe 8' and two common outlets: one which leads back to the pipeline 6 through a second flow module 5" and second piece of pipe 8", and one which leads to an additional pipeline 6' through a third flow module 5" and a fluid line 14. At least one of the processing systems 13', 13", 13''' is a separator such that e.g. separated gas can be guided to the additional pipeline 6' through the third flow module 5" and the fluid line 14 whereas separated oil can be guided back to the pipeline 6 through the second flow module 5" and the second piece of pipe 8". The processing systems 13', 13", 13''' can be any combinations of a booster(s), separator(s), pump(s), etc. Although three processing systems 13', 13", 13''' are disclosed in FIG. 5, it is obvious for the skilled person that there may be fewer or more processing systems on the same foundation 1', and that more foundation(s) 1', 1", 1''', 1'''' can be arranged in connection with each other. The pipeline 6 rests on the first guide system 4' while the additional pipeline 6' rests on the second guide system 4".

Thus, at least one of the objectives of the invention is achieved by the system and method as disclosed in the drawings.

In the preceding description, various aspects of the invention have been described with reference to illustrative embodiments. For purposes of explanation, systems and configurations were set forth in order to provide a thorough understanding of the system and its workings. However, this description is not intended to be construed in a limiting sense. Various modifications and variations of the illustrative embodiments, as well as other embodiments of the system, which are apparent to persons skilled in the art to which the disclosed subject matter pertains, are deemed to lie within the scope of the present invention as defined in the appended claims.

| Reference list: | |
|---|---|
| 1', 1", 1''', 1'''' | Foundation |
| 2', 2", 2''', 2'''' | Xmas Tree slot |
| 3', 3", 3''', 3'''' | Subsea station, Xmas Tree |
| 4', 4", 4''', 4'''' | guide system |
| 5', 5", 5''', 5'''' | Flow module |
| 6 | pipeline |
| 6' | Additional pipeline, umbilical |
| 6" | Additional pipeline, Gas Lift (GL), Gas Injection (GI) |
| 7', 7", 7''', 7'''' | T-connection |
| 8', 8", 8''', 8'''' | Piece of pipe |
| 9', 9", 9''', 9'''' | MILC - Modular In Line Tee Connector |
| 10 | UTA - Umbilical Termination Assembly |
| 11', 11", 11''', 11'''' | Flying lead |
| 12', 12", 12''', 12'''' | Connection point |
| 13', 13", 13''' | Subsea station, Processing system/processing equipment |
| 14 | Fluid line |
| 15', 15" | Connection line |
| 16 | Flow regulating device |
| 100 | Subsea System |

The invention claimed is:

1. A method of installing a subsea system, the method comprising:
   preparing a first foundation comprising at least a first dedicated position for receiving a first subsea station;
   providing the first foundation with at least a first guide system;
   installing the first foundation at a subsea location;
   preparing at least a first subsea station comprising a first flow module for connection with a pipeline;
   installing the at least first subsea station with the first flow module at the first dedicated position on the first foundation;
   preparing a pipeline and providing the pipeline with at least a first T-connection at a determined calculated position corresponding to the first dedicated position on the first foundation;
   installing the pipeline and allowing the pipeline to rest on the first guide system on the first foundation such that the first T-connection is arranged at or in the proximity of the first dedicated position on the first foundation; and preparing a first piece of pipe and connecting the first T-connection of the pipeline with the first flow module on the first subsea station using the first piece of pipe.

2. The method according to claim 1, wherein the method further comprises:

providing the pipeline with a second T-connection at a determined calculated position corresponding with a second dedicated position on the first foundation for receiving a second subsea station comprising a second flow module;

installing the pipeline and allowing the pipeline to rest on the at least first guide system on the first foundation such that when the pipeline is resting on the first foundation, the second T-connection is arranged at or in the proximity of the second dedicated position on the first foundation; and preparing a second piece of pipe and connecting the second T-connection of the pipeline with the second flow module on the second subsea station using the second piece of pipe.

3. The method according to claim 1, wherein the method further comprises, before lowering the first foundation subsea, providing an additional guide system on the first foundation for receiving an additional pipeline.

4. The method according to claim 1, wherein the method further comprises:

preparing a second foundation comprising at least a second dedicated position for receiving a second subsea station;

providing the second foundation with at least a second guide system;

installing the second foundation with the second guide system at a second subsea location;

providing the pipeline with a second T-connection at a determined calculated position corresponding with a second dedicated position on the second foundation for receiving a second subsea station comprising a second flow module; and installing the pipeline by allowing the pipeline to rest on the at least first guide system on the first foundation and the second guide system on the second foundation, such that when the pipeline is resting on the first foundation and the second foundation, the first and second T-connections are respectively arranged at or in the proximity of the first and second dedicated positions; and preparing pieces of pipe and connecting the first and second T-connections of the pipeline with the first and second flow modules, respectively, using the pieces of pipe.

5. The method according to any of claims 1-4, wherein a number of the subsea stations are Xmas Trees and the method further comprises swapping the flow direction of a modular in line tee connector (MILC) which is connected between the flow module for one of said Xmas Trees and the pipeline or additional pipeline so as to change the Xmas tree from operating as a production Xmas Tree to an injection Xmas tree, or vice versa.

6. The method according to any of claims 1-4, wherein the method further comprises, after installing at least one of the first, second or any additional foundations, but before installing one of said subsea stations on said foundation, drilling a well through a Xmas tree slot in said foundation.

7. The method according to any of claims 1-4, wherein at least one of the subsea stations is a processing system, processing equipment, a X-mas tree, or a combination thereof.

8. A subsea system comprising:

a first foundation comprising at least a first dedicated position for receiving a first subsea station;

at least a first subsea station comprising a first flow module; and a pipeline for connection with the first flow module;

wherein the first foundation comprises at least a first guide system for guiding of the pipeline to rest on the first foundation; and;

wherein the pipeline is provided with at least a first T-connection, and wherein, when the pipeline is resting on the first foundation, the first T-connection is arranged at or in the proximity of the first dedicated position on the first foundation.

9. The subsea system according to claim 8, wherein the pipeline is provided with a second T-connection, and wherein, when the pipeline is resting on the first foundation, the second T-connection is arranged at or in the proximity of a second dedicated position on the first foundation.

10. The subsea system according to claim 8, wherein the first foundation comprises an additional guide system for receiving an additional pipeline.

11. The subsea system according to claim 8, wherein the system further comprises a number of additional foundations, each of which is provided with at least one corresponding guide system.

12. The subsea system according to claim 11, wherein at least one of said foundations is a well template or a satellite well.

13. The subsea system according to claim 8, wherein the subsea station is a processing system, processing equipment, a X-mas tree, or a combination thereof.

* * * * *